(12) United States Patent
Lehmann

(10) Patent No.: US 11,809,920 B2
(45) Date of Patent: *Nov. 7, 2023

(54) SYSTEMS AND METHODS FOR MULTI-EVENT CORRELATION

(71) Applicant: Digital Guardian LLC, Waltham, MA (US)

(72) Inventor: John H. Lehmann, Charlton, MA (US)

(73) Assignee: DIGITAL GUARDIAN LLC, Waltham, MA (US)

( * ) Notice: Subject to any disclaimer, the term of this patent is extended or adjusted under 35 U.S.C. 154(b) by 204 days.

This patent is subject to a terminal disclaimer.

(21) Appl. No.: 17/327,663

(22) Filed: May 21, 2021

(65) Prior Publication Data

US 2021/0279117 A1 Sep. 9, 2021

Related U.S. Application Data

(63) Continuation of application No. 16/428,122, filed on May 31, 2019, now Pat. No. 11,016,826.

(51) Int. Cl.
*G06F 9/54* (2006.01)
*G06F 11/30* (2006.01)
*H04L 9/40* (2022.01)

(52) U.S. Cl.
CPC .......... *G06F 9/542* (2013.01); *G06F 11/3017* (2013.01); *G06F 11/3072* (2013.01); *H04L 63/1416* (2013.01)

(58) Field of Classification Search
None
See application file for complete search history.

(56) References Cited

U.S. PATENT DOCUMENTS

| 2005/0010545 | A1 | 1/2005 | Joseph |
| 2009/0070785 | A1 | 3/2009 | Alvez et al. |
| 2013/0139179 | A1* | 5/2013 | Roll ...................... G06F 11/079 719/318 |
| 2015/0074164 | A1 | 3/2015 | Boger et al. |

* cited by examiner

*Primary Examiner* — Syed A Roni
(74) *Attorney, Agent, or Firm* — Fredrikson & Byron, P.A.

(57) ABSTRACT

Provided herein are systems and methods for multi-event correlation. Receiving a stream of events, each leaf rule engine may detect a plurality of events from the stream that matches a characteristic for the leaf rule engine. Each leaf rule engine may identify, from the plurality of events and within a time window, a group of events that satisfies a condition for the respective leaf rule engine. A root conditions engine may receive a stream of leaf events corresponding to the group of events identified by each leaf rule engine. The root conditions engine may identify, from the received stream of leaf events and within a root time window, a collection of events that satisfies a condition for the root conditions engine. A trigger may execute an action according to the collection of events identified within the root time window.

20 Claims, 7 Drawing Sheets

SYSTEMS AND METHODS FOR MULTI-EVENT CORRELATION

CROSS REFERENCE TO RELATED APPLICATIONS

The present application claims priority as a continuation under 35 U.S.C. § 120 to U.S. patent application Ser. No. 16/428,122, titled "Systems and Methods for Multi-Event Correlation," filed May 31, 2019, which is incorporated herein in its entirety by reference.

TECHNICAL FIELD

The present application relates generally to systems and methods for event correlation, including but not limited to systems and methods for multi-event correlation using common field values.

BACKGROUND

A computing device may execute a process. While the process is running on the computing device, one or more events may be invoked synchronously or asynchronously. A user or person can also trigger one or more events. In a networked environment various events can occur at various times. Some of these events may be related in some way.

SUMMARY

Described herein are systems and methods for multi-event correlation. A computing device may execute a process, such as an application, a routine, a daemon, a task, or other executable modules. While the process is running on the computing device, one or more events may be invoked and handled in accordance with the instructions for the process. The invocation of the event may be synchronous with a control flow of the process, occurring responsive to a call by another function of the process. The invocation of the event may be also asynchronous, occurring as a result of another action from another process running on the computing device or a user interaction with an input/output device of the computing device. Each event may be associated with or described by a field value (sometimes referred herein as metadata), such as event type, a timestamp, and/or an identifier of a user of the computing device, among other attributes. The events invoked (e.g., by process(es), device(s) and/or user(s)) and the associated field values may be recorded onto memory (e.g., a log file).

A sequence of certain events (e.g., on a computing device) may be indicative of an error, faulty performance, malicious behavior, or otherwise undesirable activity on a computing device or network in connection with the running of a process for instance. One approach in identifying such a sequence of events may include having a system administrator manually examine the events and the field values recorded on log file to root out the cause of the issue. This approach, however, may consume a significant amount of time from sifting through the records and may be prone to human error leading to higher incidences of finding false positives and overlooking true negatives. Furthermore, manually inspecting the events recorded on the log file may not be practically feasible in network environments with a multitude of computing devices, processes and/or users. Another approach to detecting the sequence of events in such network environments may include using a set of predicate logic rules to process the log file. These rules may contain a designation of certain events and field values indicative of undesirable activity. Without any more specificity, however, this approach may also suffer from high incidences of finding false positives and overlooking true negatives.

To address the technical challenges in correlating multiple events, an event correlator running on a server communicatively coupled with a computing or network environment may tie together multiple events. The event correlator may have a set of rule components to associate multiple events with one another. The stream of events from the computing devices may be fed into the rule components of the event correlator. The set of rule components in the event correlator may be hierarchical and layered, with the stream of events processed in series through the set of rule components. The rule components in an initial layer may be referred to leaf rule components. The one or more rule components in a terminal layer (or a parent layer) may be referred to a root rule component. The leaf rule components may each receive and process the stream of events from the computing device, and may feed the results of the processing into the root rule component. The root rule component may in turn receive the results from the leaf rule components, and may perform further processing onto the results to determine the occurrence of undesirable activity in the sequence of events for the process.

Each leaf rule component may include a filter, a specified time window, and a condition. The filter of each leaf rule component may specify one or more characteristics to filter the events from the stream. The characteristics specified by the filter may include a particular user, an event type, and field values of the event, among others. Events matching the characteristic specified by the filter may pass through, whereas events not satisfying any of the characteristics specified by the filter may be filtered out. The time window of each leaf rule component may specify a duration of time in which the events selected by the filter. The condition of each leaf rule component may specify a group or collection of events (which may be temporally related, although not necessarily be in a specific sequence or order) passing through the filter within the time window. By way of illustration, the condition of each leaf rule component may specify a sequence of events passing through the filter and the time window. If the passed through sequence of events satisfy the condition, the leaf rule component may generate send a firing indicating that the sequence of events satisfy the specification. On the other hand, if the passed through sequence of events does not satisfy the condition, the leaf rule component may not generate the firing and may continue to process the stream of events. Each leaf rule component independent from one another may feed the results of the processing of the stream of events into the root rule component.

The root rule component may receive the firings from one or more of the leaf rule components. The root rule component may include a specified time window and a condition. The time window of the root rule component may specify a duration of time in which the firings from the leaf rule components are to occur. The time window of the root rule component can be different from one or more of the time windows of the leaf rule components. The time window of the root rule component may for instance be larger than the time window of any of the leaf rule components, e.g., can extend across all time windows of the leaf rule component. The condition of the root rule component may specify a sequence or collection of firings to be received from the leaf rule components within the specified time window. If the sequence or collection of firings satisfies the condition within the specified time window, the root rule component may generate a firing indicating an error, anomaly, faulty performance, malicious behavior, or otherwise undesirable activity on the computing device. The root rule component may also send the firing to trigger an action based on the firing to indicate the undesirable activity on the computing device. On the other hand, if the sequence of firings does not satisfy the condition, the root rule component may not generate the firing, and may continue to monitor or wait for firings from the leaf rule component.

By processing the stream of events through separate rule components in a bifurcated manner, the event correlator may reduce the incidences of finding false positives and overlooking true negatives. In addition, the event correlator may allow for assessment of a large number of events occurring across the multitude of computing devices in the networked environment. With the enhancement in processing of the events, the cause of the erroneous performance or undesirable activity in a computing or network environment may be more readily ascertained. The cause of the undesirable activity may be alleviated, if not eliminated, from the computing or network environment.

At least one aspect of the present disclosure is directed to a system for multi-event correlation. The system can include a plurality of leaf rule engines executable on one or more servers. The plurality of leaf rule engines may receive a stream of events each corresponding to an activity of at least a user, device or program. Each leaf rule engine may detect from the stream of events a plurality of events matching a characteristic predefined for the respective leaf rule engine. Each leaf rule engine may identify, from the plurality of events and within a respective time window, a group of events that satisfies at least one condition for the respective leaf rule engine. The system may include a root conditions engine executable on the one or more servers. The root conditions engine may receive a stream of leaf events corresponding to the identified group of events from each of the plurality of leaf rule engines. The root conditions engine may identify, from the received stream of leaf events and within a root time window, a collection of events that satisfies at least one condition predefined for the root conditions engine. The system may include a trigger executable on the one or more servers. The trigger may execute an action according to the collection of events identified within the root time window.

In some embodiments, each event of the stream of events may be described by a timestamp and at least one field. In some embodiments, each leaf rule engine may store the detected plurality of events within the respective time window. In some embodiments, the respective time window of each leaf engine may be different from the parent time window. In some embodiments, a characteristic predefined for a first leaf rule engine of the plurality of leaf rule engines may include a characteristic of events identified to be a potential anomaly, risk or threat.

In some embodiments, a condition of a first leaf rule engine of the plurality of leaf rule engines may pertain to at least one of: a total number of events, devices, files or bytes accumulated within a respective time window. In some embodiments, the total number of events, devices, files or bytes may correspond to the total number of distinct events, devices, files or bytes accumulated within the respective time window. In some embodiments, the respective time window may be adjustable forward or backward in time. In some embodiments, a first leaf rule engine of the plurality of leaf rule engines is configured to update a condition for the first leaf rule engine. In some embodiments, the trigger is configured to initiate an alarm for a potential anomaly, risk or threat according to the event identified within the parent time window.

At least one aspect of the present disclosure is directed to a method for multi-event correlation. Each leaf rule engine of a plurality of leaf rule engines receiving a stream of events may detect a plurality of events from the stream of events that matches a characteristic predefined for the respective leaf rule engine. Each leaf rule engine of a plurality of leaf rule engines may identify, from the plurality of events and within a respective time window, a group of events that satisfies at least one condition for the respective leaf rule engine. A root conditions engine may receive a stream of leaf events corresponding to the group of events identified by each leaf rule engine of the plurality of leaf rule engines. The root conditions engine may identify, from the received stream of leaf events and within a root time window, a collection of events that satisfies at least one condition predefined for the root conditions engine. A trigger may execute an action according to the collection of events identified within the root time window.

In some embodiments, each event of the stream of events may be described by a timestamp and at least one field. In some embodiments, each leaf rule engine may store the detected plurality of events within the respective time window. In some embodiments, the respective time window of each leaf engine may be different from the parent time window. In some embodiments, a characteristic predefined for a first leaf rule engine of the plurality of leaf rule engines may include a characteristic of events identified to be a potential anomaly, risk or threat.

In some embodiments, a condition of a first leaf rule engine of the plurality of leaf rule engines may pertain to at least one of: a total number of events, devices, files or bytes accumulated within a respective time window. In some embodiments, the total number of events, devices, files or bytes may correspond to the total number of distinct events, devices, files or bytes accumulated within the respective time window. In some embodiments, the respective time window may be adjustable forward or backward in time. In some embodiments, a first leaf rule engine of the plurality of leaf rule engines is configured to update a condition for the first leaf rule engine. In some embodiments, the trigger is configured to initiate an alarm for a potential anomaly, risk or threat according to the event identified within the parent time window.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

It should be understood that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the concepts disclosed herein will become more apparent from the detailed description set forth below when taken in conjunction with the drawings.

DETAILED DESCRIPTION

Following below are more detailed descriptions of various concepts related to, and embodiments of, inventive systems and methods for classifying content to prevent data breach or exfiltration. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes a network environment and computing environment which may be useful for practicing various computing related embodiments described herein.

Section B describes systems and methods for multi-event correlation.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

A. Computing and Network Environment

Prior to discussing specific embodiments of the present solution, it may be helpful to describe aspects of the operating environment as well as associated system components (e.g., hardware elements) in connection with the methods and systems described herein.

Figure 1A:
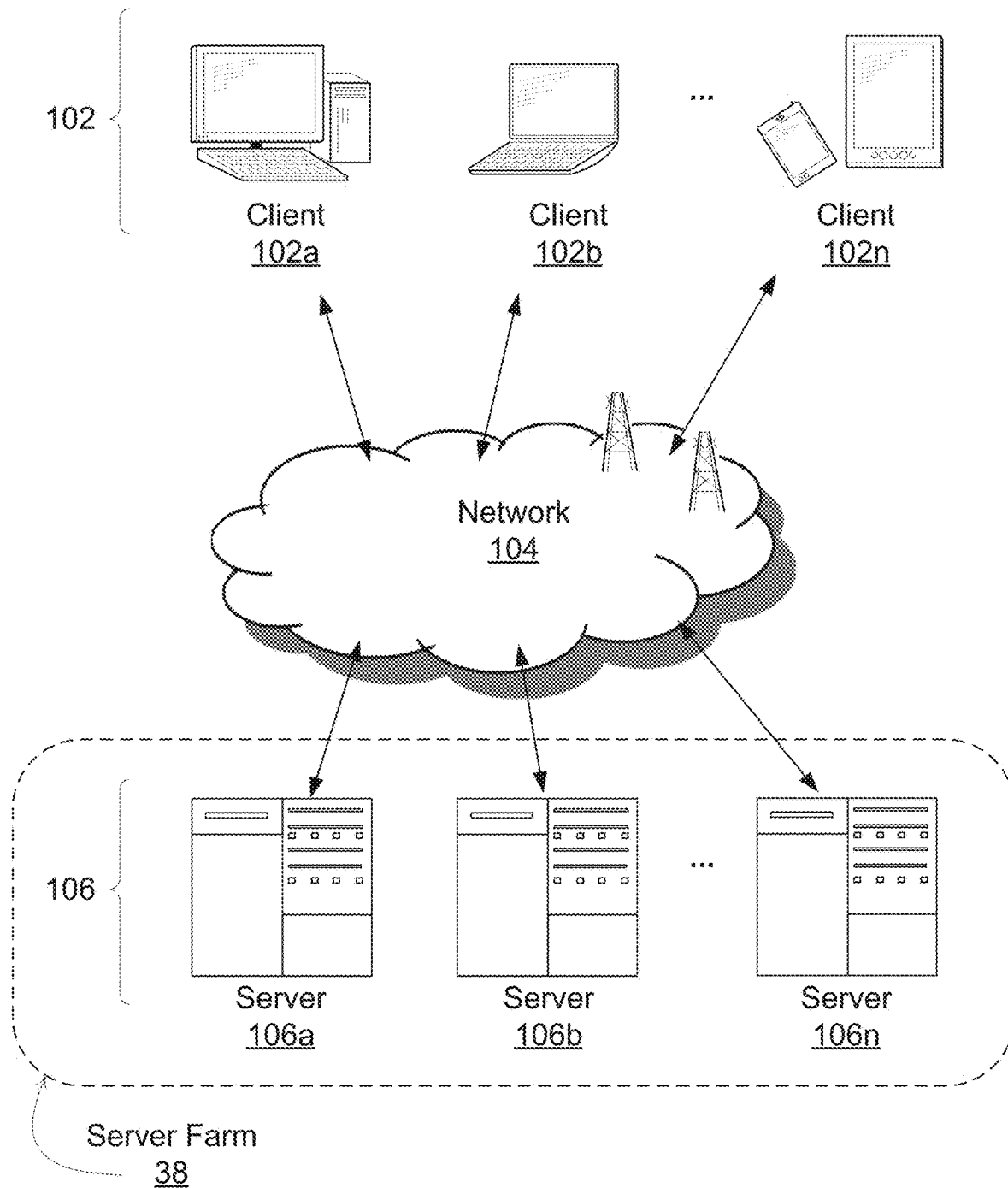
FIG. 1A is a block diagram depicting an embodiment of a network environment comprising client devices in communication with server devices.

Referring to FIG. 1A, an embodiment of a network environment is depicted. In brief overview, the illustrated exploring network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106. The clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network, which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
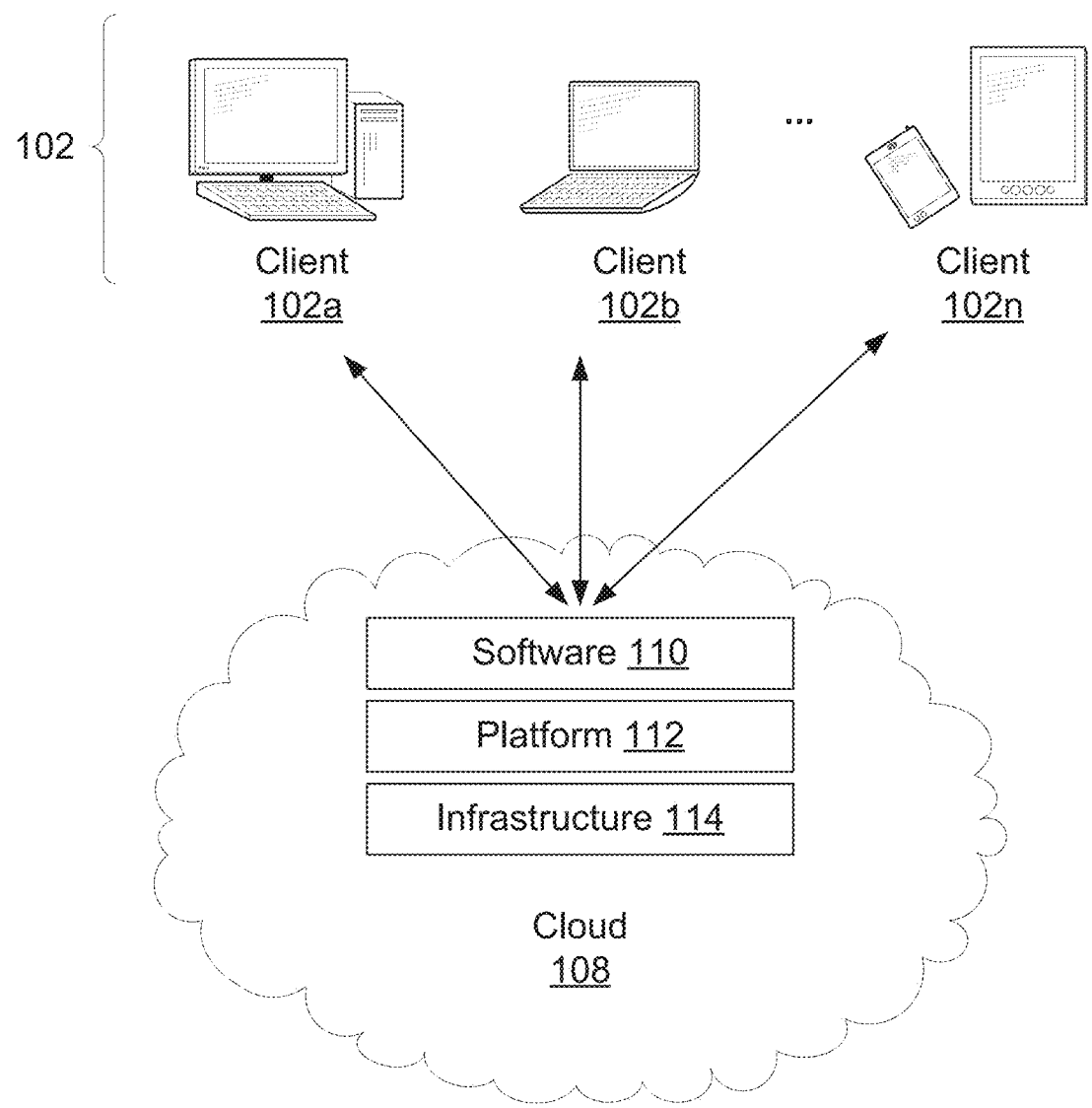
FIG. 1B is a block diagram depicting a cloud computing environment comprising client devices in communication with a cloud service provider.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
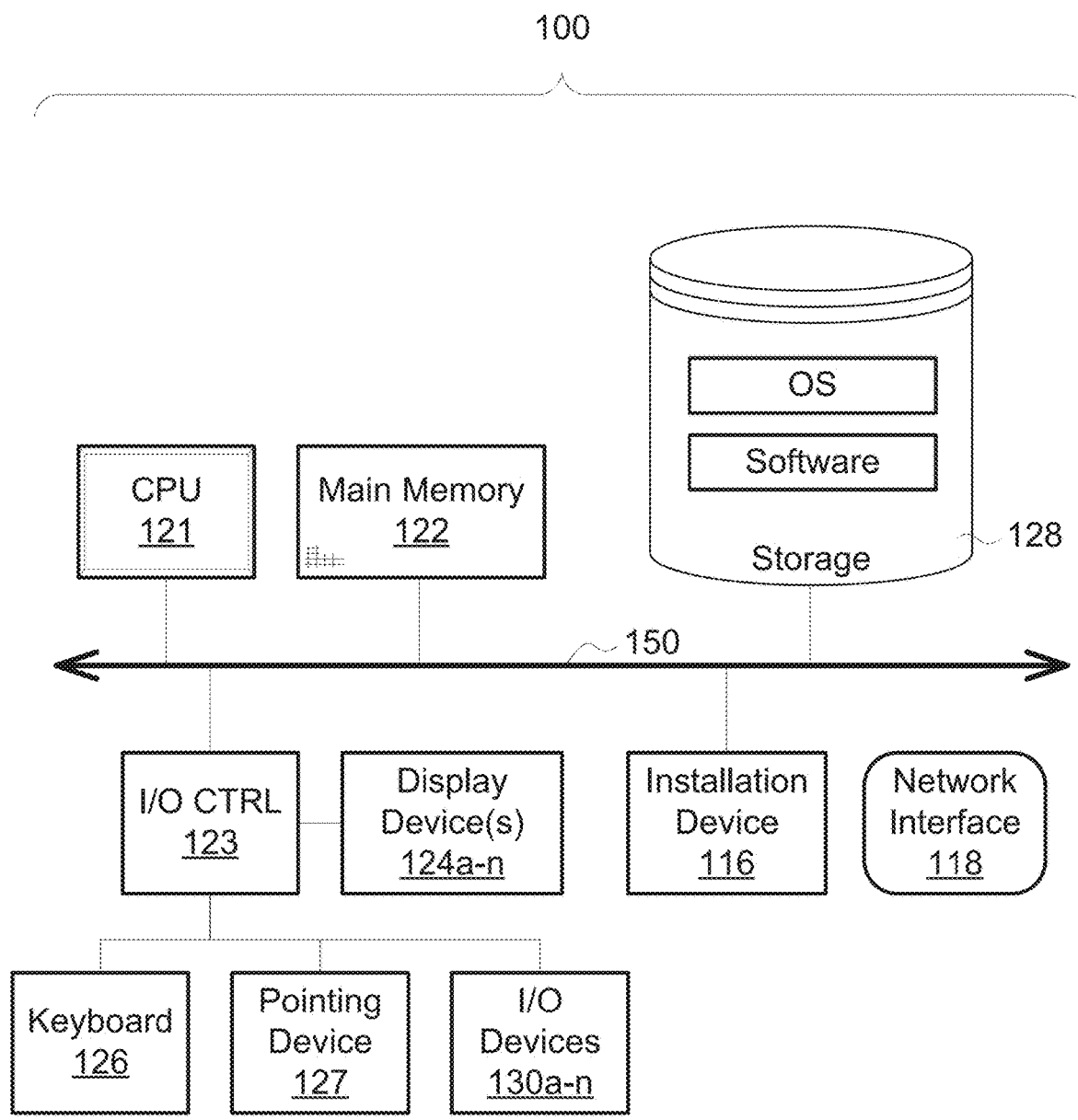
FIGS. 1C and 1D are block diagrams depicting embodiments of computing devices useful in connection with the methods and systems described herein.
Figure 1D:
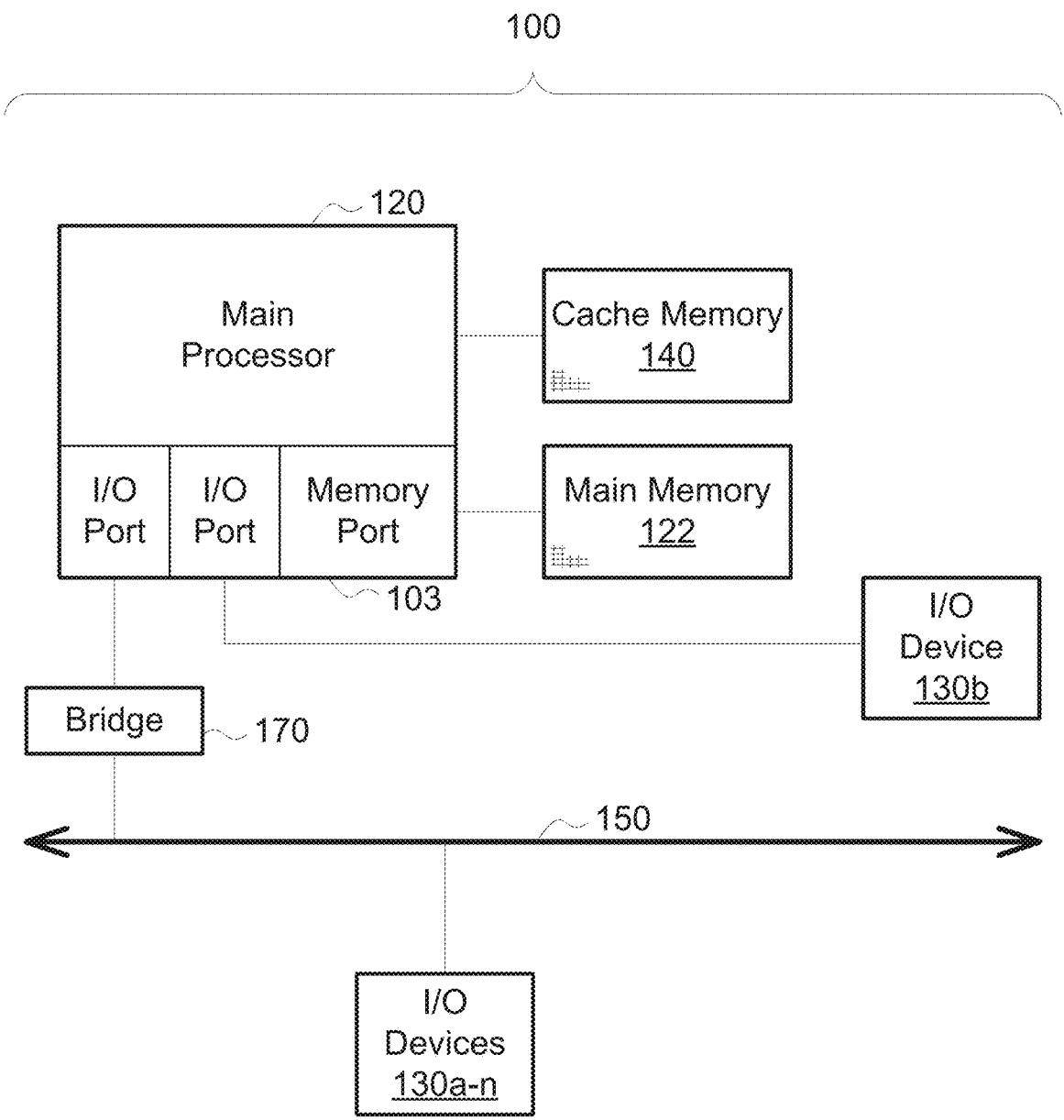

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, and/or software 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call. In some embodiments, the communication device 102 is a wearable mobile computing device including but not limited to Google Glass and Samsung Gear.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Multi-Event Correlation

Figure 2:
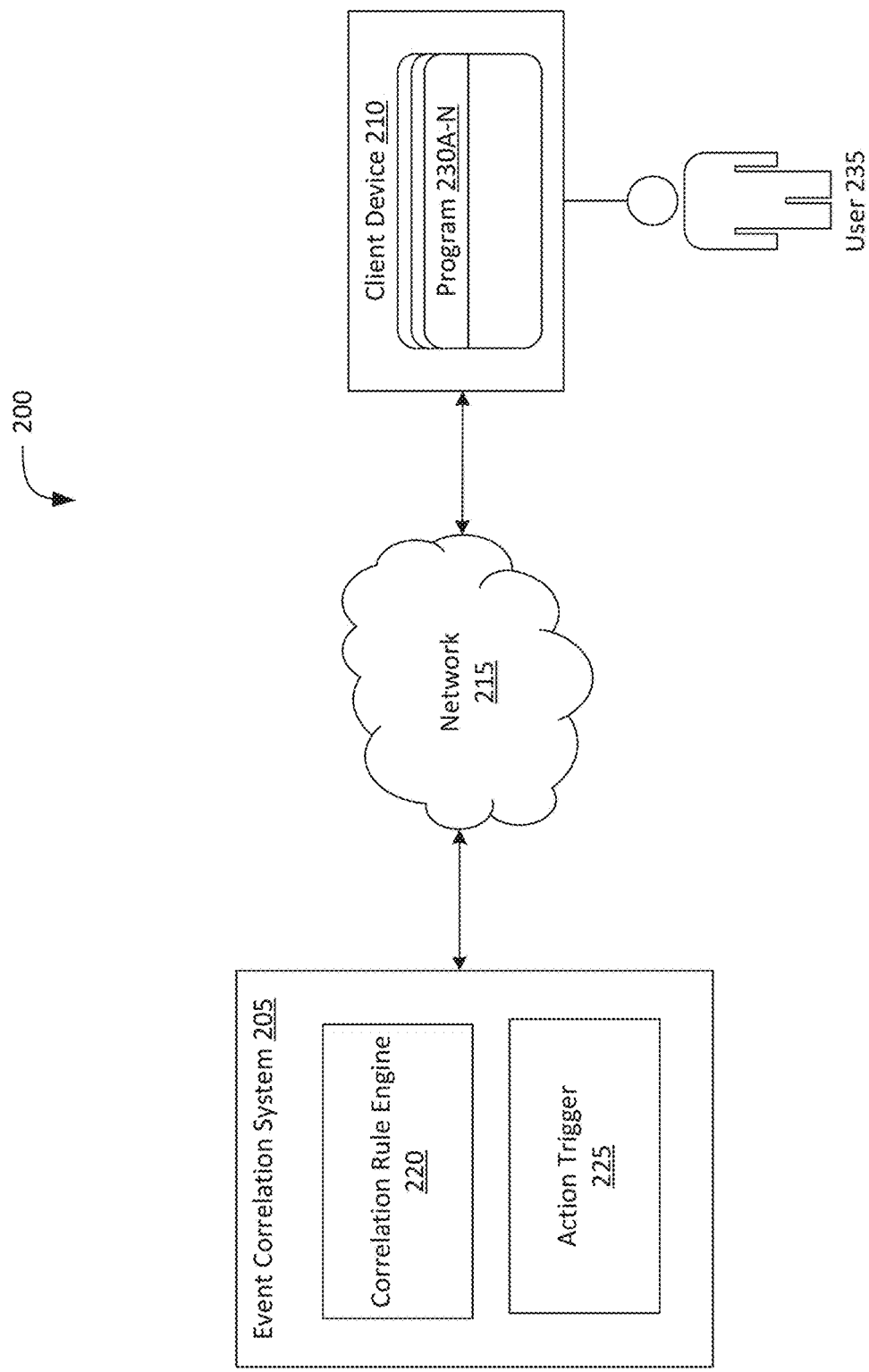
FIG. 2 is a block diagram depicting an example embodiment of a system for multi-event correlation.

Referring now to FIG. 2, an embodiment of a system 200 for multi-event correlation is depicted. In brief overview, the system 200 may include at least one event correlation system 205 and at least one client device 210 forming a computing or networked environment. The event correlation system 205 and the client device 210 may be communicatively coupled via at least one network 215. The event correlation system 205 may include at least one correlation rule engine 220 and at least one action trigger 225. In some embodiments, the event correlation system 205 may run or may be executed on one or more servers or computing devices. The client device 210 may include one or more programs 230a-230n (hereinafter generally referred to as program 230). The client device 210 may be operated by at least one user 235. The network 215 may be a private network (e.g., Intranet or a virtual private network (VPN)) or a public network (e.g., the Internet) interconnecting the event correlation system 205 and the client device 210.

Figure 3:
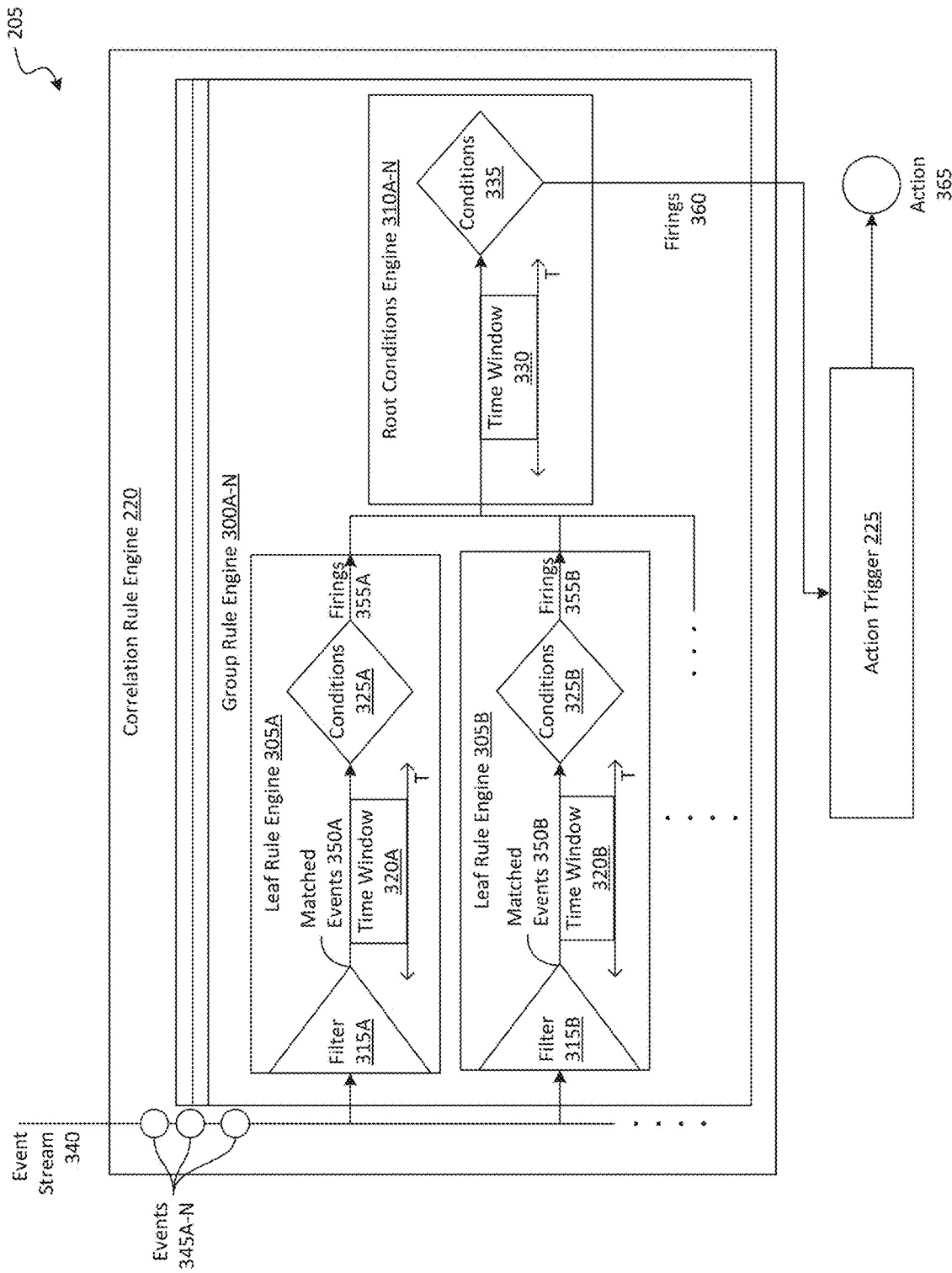
FIG. 3 is a sequence diagram depicting an example embodiment of a system of multi-event correlation.

Referring now to FIG. 3, an embodiment of the rule correlation system 205 of system 200 is depicted. In brief overview, the correlation rule engine 220 may include one or more rule engines 300a-300n (hereinafter generally referred to as group rule engine 300). Each group rule engine 300 may include one or more leaf rule engines 305a-305n (hereinafter generally referred to as leaf rule engine 305) and at least one root conditions engine 310a-n (hereinafter generally referred to as root conditions engine 310 and sometimes referred to as a parent rule engine or a parent conditions engine). Each leaf rule engine 305 may include at least one filter 315a-315n (hereinafter generally referred to as filter 315), at least one time window 320a-320n (hereinafter generally referred to as time window 320 and sometimes referred herein as a leaf time window), and one or more conditions 325a-325n (hereinafter generally referred to as conditions 325 and sometimes referred herein as a leaf condition). Each root conditions engine 310 may include at least one time window 330a-330n (hereinafter generally referred to as time window 330 and sometimes referred herein as a parent time window or a root time window) and one or more conditions 335a-335n (hereinafter generally referred to as conditions 335).

Each of the above-mentioned elements or entities (e.g., the event correlation system 205 and its components and the program 230 and its components) is implemented in hardware, or a combination of hardware and software, in one or more embodiments. For instance, each of these elements or entities could include any application, program, library, script, task, service, process or any type and form of executable instructions executing on hardware of the system, in one or more embodiments. The hardware includes circuitry such as one or more processors, for example, as described above in connection with FIGS. 1A-1D, in some embodiments, as detailed in section A.

In further detail, the correlation rule engine 220 executing on the event correlation system 205 may establish at least one event stream 340 with one or more of the client devices 210 via the network 215 to receive one or more events 345a-345n (hereinafter generally referred to as event 345). The event stream 340 may relay or convey the one or more events 345 from the client device 210 via the network 215 to the correlation rule engine 220. In some embodiments, the correlation rule engine 220 may establish the event stream 340 with one or more of the programs 230 running on the client device 210 to receive the events 345 occurring while the program 230 is running. The event stream 340 may relay or convey the events 345 from the program 230 running on the client device 210 to the correlation rule engine 220.

Each program 230 running on the client device 210 may correspond to one or more processes, such as an application, a routine, a daemon, a task, or other executable modules. As the program 230 is running on the client device 210, an event 345 may be invoked and handled in accordance with the program 230 (e.g., using an event handler or listener). Each event 345 may correspond an activity of the user 235 (e.g., via an input/output device communicatively coupled with the client device 210), the client device 210 (e.g., a background process or operating system), and/or the program 230 running on the client device 210, among others. The event 345 may be invoked synchronously. For example, the event 345 may be called or triggered by another function of the program 230 in accordance with the instruction set for the program 230. The event 345 may also be invoked asynchronously. For example, the event 345 may be invoked by the user 235 via an interaction with an input/output device (e.g., keyboard, mouse, touchscreen, microphone, or video) communicatively coupled with the client device 210. The event 345 of one program 230 may be invoked by another program 230 running on the same or another client device 210.

Each event 345 may be associated with or described by one or more field values (sometimes referred herein as metadata). The field values may include: a timestamp indicating a time at which the event 345 was invoked, an event type specifying a classification for the event 345 (e.g., a keystroke, a mouse click, and an interaction with a graphical user interface (GUI) element), an application identifier corresponding to the program 230 for which the event 345 is invoked, a user identifier corresponding to the user 235 operating the program 230, a device identifier corresponding to the client device 210 running the program 230, a file identifier corresponding to a file affected by the event 345, and/or a number of bytes affected by the event 345, among other attributes. The timestamp for the event 345 may include a date (e.g., in year, month, and day format) and/or a time (e.g., in hour, minutes, and seconds format). The event type for the event 345 may include an identifier for the classification of the event 345. The application identifier for the event 345 may include a filename and/or file path referencing the program 230 for which the event 345 is invoked. The user identifier may include a set of alphanumeric characters associated with the user 235 (e.g., account identifier or email address). The device identifier may include a set of alphanumeric characters referencing the client device 210 running the program 230. The file identifier may include a set of alphanumeric characters of the filename corresponding to a file affected (e.g., read or write) by the event 345. The number of bytes may include a numerical value representing the number of bytes affected by the event 345 (e.g., data transfer, write, delete, or otherwise edit). In some embodiments, the one or more field values may be included with the event 345 itself. In some embodiments, the one or more field values for the event 345 may be in metadata accompanying or otherwise associated with the event 345.

The client device 210 may contribute or provide its event(s) 345 to the event stream 340 (e.g., via detection and/or interception by an agent of the event correlation system 205) over the network 215 to the correlation rule engine 220. In some embodiments, the client device 210 may be configured (e.g., with another program) to interface with the event correlation system 205 and to send the events 345 via the event stream 340 over the network 215. In some embodiments, the client device 210 (e.g., via a client-side agent) may monitor for the events 345 invoked while running one or more programs 230. Responsive to detection of each event 345, the client device 230 may send the event 345 via the event stream 340 over the network 215 to the correlation rule engine 220. In some embodiments, the client device 210 may identify and record each event 345 onto a log file for the program 230 maintained on the client device 210. The client device 210 may be configured (e.g., with another program) to interface with the event correlation system 205, to record the events 345, and to send the events 345 via the event stream 340. The client device 210 may periodically send the events 345 recorded on the log file to the correlation rule engine 220 via the event stream 340 over the network 215 (e.g., every 10 seconds to 2 hours).

From the client device 210, the correlation rule engine 220 may receive the one or more events 345 via the event stream 340 over the network 215. In some embodiments, the correlation rule engine 220 may receive the events 345 from the program 230 running on the client device 210 via the event stream 340 over the network 215. In response to receipt of each event 345 via the event stream 340, the correlation rule engine 220 may feed, input, or otherwise provide the received event 345 into each of the leaf rule engines 305. For example, as the events 345 are received via the event stream 340, the correlation rule engine 220 may pass the events 345 as parameters for input into and processing by the leaf rule engine 305. In some embodiments, the correlation rule engine 220 may provide a copy of the received event 345 to each leaf rule engine 305. In some embodiments, the correlation rule engine 220 may store the events 345 received via the event stream 340 onto a database of the event correlation system 205. For example, the correlation rule engine 220 may temporarily store or buffer the events 345 onto the database of the event correlation system 205. The correlation rule engine 220 may access the events 345 maintained on the database to feed, input, or otherwise provide to each of the leaf rule engines 305.

In some embodiments, the correlation rule engine 220 may provide the received events 345 into each group rule engine 300. The rule engines 300 may define, contain, or otherwise include the set of leaf rule engines 305 and the root condition engine 310. The set of rule engines 305 and the root condition engine 310 in one group rule engine 300 may differ from the set of leaf rule engines 305 and the root conditions engine 310 in another group rule engine 300. For example, one group rule engine 300 may handle the processing of the events 345 for a particular user 235, while another group rule engine 300 may handle the processing of the events 345 for a particular client device 210. The group rule engine 300 may have a n-depth hierarchy for the set of leaf rule engines 305 and the root condition engine 310. In some embodiments, the group rule engine 300 may have a two-level hierarchy and include a single root conditions engine 310 functioning as the parent over the set of leaf rule engines 305 (e.g., as depicted in FIG. 3). In some embodiments, the group rule engine 300 may include a hierarchical or tree structure, which can have multiple levels of leaf rule engines 305 and root condition engines 310. For example, there may be two layers of leaf rule engine 305 and followed by one root condition engine 310. The root-to-leaf (or parent-to-child) relationship between any leaf rule engine 305 and the root condition engine 310 can correspond to any two levels of the group rule engine 300. Upon receipt of the events 345 via the event stream 340 by the correlation rule engine 220, the group rule engine 300 may in turn provide the received events 345 into each leaf rule engine 305 for processing of the events 345. In some embodiments, the group rule engine 300 may provide a copy of the received events 345 to each rule engine 305.

Each leaf rule engine 305 may receive the one or more events 345 conveyed via the event stream 340. In some embodiments, each leaf rule engine 305 may receive the one or more events 345 via the event stream 340 provided by the correlation rule engine 220. In some embodiments, at least two of the leaf rule engines 305 of the correlation rule engine 220 may receive the one or more events 345 simultaneously or at approximately the same time (e.g., within 10 seconds). In some embodiments, the leaf rule engine 305 may access the event stream 340 to retrieve, access or monitor the one or more events 345 conveyed through the event stream 340. With the receipt of the events 345 via the event stream 340, each leaf rule engine 305 may process each event 345. The leaf rule engine 305 may be of a single-condition type or a multi-condition type in regards to processing the event 345. The leaf rule engine 305 of the single-condition type may process each event 345 from the event stream 340 using the filter 315. The leaf rule engine 305 of the multi-condition type may process each event 345 from the event stream 340 using the filter 315, the time window 320, and the conditions 325.

From the event stream 340, each leaf rule engine 305 may find, identify, or otherwise detect one or more events 345 matching a characteristic defined for the leaf rule engine 305. The filter 315 may define the characteristic for the leaf rule engine 305. The characteristic may correspond to one or more field values in events 345 for additional processing by the leaf rule engine 305. For example, the characteristic defined by the filter 315 may correspond to a particular user 235 (e.g., using a device identifier or an account identifier) such that the leaf rule engine 315 is to further process events 345 associated with activity from the user 235. In some embodiments, the characteristic may be one or more field values of the event 345 identified to be a potential anomaly, risk, or a threat. For example, the characteristic specified by the filter 315 may include an application identifier (e.g., a program filename) corresponding to potential malware or an outdated program. The anomaly of the characteristic may specify one or more unexpected or matching field values for the event 345. The risk of the characteristic may designate one or more field values in the event 345 as likely to cause damage or impairment to the program 230 or the client device 210 running the program 230. The threat of the characteristic may indicate one or more field values in the event 345 as malicious or dangerous to the program 230, the client device 210 and/or the computing/networked environment. The characteristic specified by the filter 315 may also include an event type corresponding to the classification for the event 345 (e.g., a mouse click, hover over, or resize). In some embodiments, the filter 315 specifying the characteristic for the leaf rule engine 305 may be defined using a script. The script for the filter 315 may include markup language, for instance in the form of:

"filter":
  "field": "dg_proc_file_name",
  "operator": "in",
  "values": [
    "at.exe",
    "cacls.exe", "dsquery.exe",
"ipconfig.exe",
"net.exe",
"net1.exe",
"netstat.exe",
"nslookup.exe",
"ping.exe",
"sc.exe",
"schtasks.exe",
"systeminfo.exe",
"taskhost.exe",
"tasklist.exe",
"taskmgr.exe"
]
}

In this example, the markup for the filter 315 may specify that the event 345 is to fall under one of the named application identifiers.

To detect the one or more events 345 from the event stream 340, the leaf rule engine 305 may parse each event 345 to identify the one or more field values from the event 345. In some embodiments, the leaf rule engine 305 may parse the metadata or field(s) associated with the event 345 to identify the one or more field values for the event 345. With the identification of the field values, the leaf rule engine 305 may compare the field values of the event 345 with the characteristics defined for the leaf rule engine 305. In some embodiments, the leaf rule engine 305 may compare the field values parsed from the event 345 with the characteristics defined by the filter 315. In comparing, the leaf rule engine 305 may apply the filter 315 onto the field values identified from the event 345. If the field values of the event 345 are determined not to match the defined characteristics, the leaf rule engine 305 may remove or filter the event 345 from additional processing. In some embodiments, the leaf rule engine 305 may determine that the field values do not match the defined characteristics, when at least one of the field values do not correspond or differ from the defined characteristics. On the other hand, if the field values of the event 345 are determined to match the defined characteristics, the leaf rule engine 305 may select or pass the event 345 for additional processing by the leaf rule engine 305. In some embodiments, the leaf rule engine 305 may determine that the field values match the defined characteristics, when all the field values correspond to or are equal to the defined characteristics. The leaf rule engine 305 may provide the selected events 345 as one or more matched events 350a-350n (hereinafter generally referred to as matched event 350).

The leaf rule engine 305 may identify one or more of the matched events 350 within the time window 320. In some embodiments, the leaf rule engine 305 may apply the time window 320 to the matched events 350, subsequent to applying the filter 315. The time window 320 may specify a duration of time within which the matched events 350 are to occur for additional processing by the leaf rule engine 305. In some embodiments, the time window 320 may specify the duration of time relative to a point in time (e.g., to a current time, or to a certain/reference event) within which the matched events 350 for additional processing by the leaf rule engine 305. For example, the time window 320 may range anywhere between 15 seconds to 30 minutes backwards or forwards from the set point in time. In some embodiments, the time window 320 may specify an initial time and a terminal time for the duration of time between which the matched events 350 are to occur for additional processing by the leaf rule engine 305. For example, the time window 320 may specify an initial time of 2:30 am and a terminal time of 4:30 am. The time windows 320 of the leaf rule engines 305 in the group rule engine 300 may differ from one another. A time windows 320 may be shifted or reframed in time, for instance in an attempt to match against one or more sets of events. In some embodiments, the time window 320 of at least one of the leaf rule engines 305 may differ from the time window 320 of another leaf rule engine 305. In some embodiments, the time window 320 may be defined using a script. The script for the time window 320 may correspond to markup language, for example in the form of:
"time_unit_count": 10,
"time_unit": "minutes"
In this example, the markup language defining the time window 320 may specify that the matched events 350 are to occur within 10 minutes.

To identify the one or more of the matched events 350 within the time window 320, the leaf rule engine 305 may parse each matched event 350 to identify the timestamp corresponding to the time at which the event 345 was invoked. In some embodiments, the leaf rule engine 305 may parse the one or more field values of each matched event 350 to identify the timestamp from the field values of the matched event 350. With the identification of the timestamp of the matched event 350, the leaf rule engine 305 may compare the timestamp of the matched event 350 with the time window 320. In some embodiments, the leaf rule engine 305 may maintain a timer or clock to keep track of a current time and to compare the timestamp of the matched event 350 against the time window. By comparing the timestamp of the matched event 350 against the time window 320, the leaf rule engine 305 may determine whether the matched event 350 is within the time duration as specified by the time window 320.

In some embodiments, the leaf rule engine 305 may determine whether the timestamp of the matched event 350 is within a specified time duration relative to the current time (or to a reference set point in time). When the timestamp of the matched event 350 is within the duration of time specified by the time window 320 relative to the set point in time (e.g., the current time), the leaf rule engine 305 may determine that the matched event 350 is within the time window 320. Otherwise, when the timestamp of the matched event 350 is not within the duration of time specified by the time window 320 relative to the current time or set point, the leaf rule engine 305 may determine that the matched event 350 is outside the time window 320. In some embodiments, the leaf rule engine 305 may determine whether the timestamp of the matched event 350 is between the initial time and the terminal time defined by the time window 320. When the timestamp of the matched event 350 is between the initial time and the terminal time defined by the time window 320, the leaf rule engine 305 may determine that the matched event 350 is within the time window 320. Otherwise, when the timestamp of the matched event 350 is not between the initial time and the terminal time defined by the time window 320, the leaf rule engine 305 may determine that the matched event 350 is outside the time window 320.

If the matched event 350 is determined to be within the time window 320, the leaf rule engine 305 may pass the matched event 350 for additional processing by the leaf rule engine 305. In some embodiments, the leaf rule engine 305 may also store the matched events 350 identified as within the time window 320. The matched events 350 identified as within the time window 320 may be stored on a database maintained by the leaf rule engine 305. In some embodiments, the leaf rule engine 305 may subsequently access the database to retrieve the matched events 350 identified as within the time window 320 for additional processing. On the other hand, if the matched event 350 is determined to be outside the time window 320, the leaf rule engine 305 may remove the matched event 350 from additional processing by the leaf rule engine 305.

From the matched events 350 identified as within the time window 320, the leaf rule engine 305 may identify a group of events satisfying the conditions 325 specified for the leaf rule engine 305. The conditions 325 may correspond to or include constraints that the matched events 350 identified as within the time window 320 are to satisfy for additional processing by the root conditions engine 310 for the group rule engine 300 as a parent over the set of leaf rule engines 305. For example, the constraints for the conditions 325 may include one or more of the field values or other attributes related to the events 350. The conditions 325 may specify or otherwise pertain to a total number of specific events, a total number of devices, a total number of files, or a total number of bytes, among others, in the matched events 350 over the time window 320. The total number of events may specify a minimum or maximum number of the matched events 350 within the time window 320 are to occur to satisfy the conditions 325. In some embodiments, the total number of events may specify the minimum or maximum number of distinct events among the matched events 350. The total number of devices may specify a minimum or maximum number of devices (e.g., the client devices 210) on which the matched event 350 is invoked. In some embodiments, the total number of devices may specify a minimum number of distinct devices. The total number of files may specify a minimum or maximum number of files affected by the matched events 350 within the time window 320 (e.g., in reading or writing). In some embodiments, the total number of files may specify a minimum or maximum number of distinct files. The total number of bytes may specify a minimum or maximum number of bytes affected by the matched events 350 within the time window 320 (e.g., in reading or writing). In some embodiments, the total number of bytes may specify a minimum or maximum number of differing bytes or chunks.

The conditions 325 may be defined using a script. The script for the conditions 325 may include markup language, for instance in the form of:

"conditions": [
  {
    "type": "distinct",
    "count": 3,
    "field": "dg_proc_file_name"
  },
  {
    "type": "sum",
    "sum": 100000000,
    "field": "uad_bw"
  }
]

In the example above, the conditions 325 may include two constraints. The first constraint may specify that there are to be three distinct files referenced in the matched events 350 identified as within the time window 320. The second constraint may indicate that the total number of bytes affected by the matched events 350 over the time window 320 are to be at least 100,000,000 bytes.

In identifying the group of events, the leaf rule engine 305 may determine or identify various one or more parameters related to the matched events 350 identified as within the time window 320. The parameters may include a number of events, a number of devices, a number of files, and a number of files from the matched events 350 over the time window 320. In some embodiments, the leaf rule engine 305 may identify a number of the matched events 350 identified as within the time window 320. In some embodiments, the leaf rule engine 305 may maintain a counter to iteratively tally or track the number of matched events 350 passing through the time window 320. In some embodiments, the leaf rule engine 305 may also parse each matched event 350 identified as within the time window 320 to identify the one or more field values of the matched event 350. The identified field values from the matched event 350 may include the application identifier, the number of bytes, and/or the file identifiers, among others. In some embodiments, the leaf rule engine 305 may identify the number of bytes from the files corresponding to the file identifiers in the matched event 350. The leaf rule engine 305 may find the files corresponding to the file identifiers. With the identification of the files, the leaf rule engine 305 may identify a length of the files corresponding to the file identifiers. Based on the length of the files, the leaf rule engine 305 may determine the number of bytes.

With the identification of various parameters, the leaf rule engine 305 may compare the parameters related to the matched events 350 identified as within the time window 320 against the constraints specified by the conditions 325. In some embodiments, the leaf rule engine 305 may apply the conditions 325 onto the matched events 350 identified as within the time window 320 to identify the group of events. In comparing, the leaf rule engine 305 may determine whether each parameter related to the matched events 350 satisfies a corresponding constraint of the conditions 325. In some embodiments, the leaf rule engine 305 may shift or adjust the time window 320 in applying the conditions 325. The time window 320 may be adjustable forward or backward in time. By adjusting the time window 230, the leaf rule engine 305 may identify a different set of matched events 350. The leaf rule engine 305 may apply the constraints of the conditions 325 to the different set of matched events 350 identified from adjusting the time window 320 to identify a group of events satisfying the conditions 325.

In some embodiments, the leaf rule engine 305 may compare the number of events identified from the matched events 350 with the total number of events specified by the conditions 325. If the number of events is less than or equal to the maximum number of events or is greater than or equal to the minimum number of events (e.g., within a defined range of number of events), the leaf rule engine 305 may determine that the number of events satisfy the total number of events. Otherwise, if the number of events is greater than the maximum number of events or is less than the minimum number of events, the leaf rule engine 305 may determine that the number of events does not satisfy the total number of events. In some embodiments, the leaf rule engine 305 may compare the number of devices identified from the matched events 350 with the total number of devices specified by the conditions 325. If the number of devices is less than or equal to the maximum number of devices and/or is greater than or equal to the minimum number of devices, the leaf rule engine 305 may determine that the number of devices satisfy the total number of events. Otherwise, if the number of devices is greater than the maximum number of devices and/or is less than the minimum number of devices, the leaf rule engine 305 may determine that the number of devices does not satisfy the total number of devices.

In some embodiments, the leaf rule engine 305 may compare the number of files identified from the matched events 350 with the total number of files specified by the conditions 325. If the number of files is less than or equal to the maximum number of files or is greater than and/or equal to the minimum number of files, the leaf rule engine 305 may determine that the number of files satisfy the total number of files. Otherwise, if the number of files is greater than the maximum number of files or is less than the minimum number of files, the leaf rule engine 305 may determine that the number of files does not satisfy the total number of files. In some embodiments, the leaf rule engine 305 may compare the number of bytes identified from the matched events 350 with the total number of bytes specified by the conditions 325. If the number of bytes is less than or equal to the maximum number of bytes or is greater than or equal to the minimum number of bytes, the leaf rule engine 305 may determine that the number of bytes satisfy the total number of events. Otherwise, if the number of bytes is greater than the maximum number of bytes and/or is less than the minimum number of bytes, the leaf rule engine 305 may determine that the number of bytes does not satisfy the total number of bytes.

When the parameters related to the matched events 350 within the time window 320 satisfy the all constraints of the conditions 325, the leaf rule engine 305 may identify the matched events 350 as a group of events for triggering a firing. In some embodiments, the leaf rule engine 305 may select or identify the matched events 350 as at least one firing 355 to provide for additional processing by the root conditions engine 310 of the group rule engine 300. In some embodiments, the firing 355 may include the group of events identified from the matched events 350 satisfying the conditions 325. In some embodiments, the firing 355 may indicate that at least a subset of the events 345 received via the event stream 345 may be passed through the filter 315 and satisfy the conditions 325 within the time window 320 for the respective leaf rule engine 305 of the multi-condition type. In some embodiments, the firing 355 is such that at least one of the events 345 received via the event stream 345 may be passed through the filter 315 for the respective leaf rule engine 305 of the single-condition type. The leaf rule engine 305 may provide the group of events as the firing 355 to the root conditions engine 310 for additional processing. In some embodiments, the leaf rule engine 305 may store the group of events into a database for the leaf rule engine 305. On the other hand, when the parameters related to the matched events 350 within the time window 320 do not satisfy at least one of the constraints of the conditions 325, the leaf rule engine 305 may identify none of the matched events 350 as satisfying the conditions 325. In addition, the leaf rule engine 305 may continue to apply the conditions 325 to the matched events 350 identified as within the time window 320.

Subsequently, the root conditions engine 310 may receive the one or more firings 355 from the set of leaf rule engines 305 of the group rule engine 300. The firings 355 may be received by the root conditions engine 310 as a stream of events corresponding to the identified group of events from the leaf rule engines 305. As the parent, the root conditions engine 310 may receive the firings 355 from the set of leaf rule engines 305 under, linked with, or otherwise associated with the root conditions engine 310 in the group rule engine 300. In some embodiments, the root condition engine 310 may access or be in communication with each leaf rule engine 305 to retrieve the group of events identified by the leaf rule engine 305. In some embodiments, the root condition engine 310 may access a database (or records) maintained by the leaf rule engine 310 to retrieve the group of events. Upon receipt of the group of events in the firings 355, the root conditions engine 310 may process the group of events using the time window 330 and the conditions 335. Unlike the leaf rule engines 305, the root conditions engine 310 may lack the filter 315 for instance.

Receiving the firings 355 including the group of events identified by the set of leaf rule engines 305 in the group rule engine 300, the root conditions engine 310 may identify a subset of firings 355 within the time window 330 (sometimes referred herein as a root time window or a parent time window). The time window 330 may specify a duration of time within which the firings 355 are to occur for additional processing by the root conditions engine 310. In some embodiments, the time window 330 may specify the duration of time relative to a point in time (e.g., a current time) within which the firings 355 for additional processing by the root conditions engine 310. For example, the time window 330 may range anywhere between 15 seconds to 30 minutes backwards or forwards from the set point in time. In some embodiments, the time window 330 may specify an initial time and a terminal time for the duration of time between which the firings 355 are to occur for additional processing by the root conditions engine 310. For example, the time window 330 may specify an initial time of 12:00 am and a terminal time of 5:30 am. The time window 330 of the root conditions engine 310 may differ from the time windows 320 of the set of leaf rule engines 305 in the group rule engine 300. In some embodiments, the time window 300 of the root conditions engine 310 may be longer in the duration of time than the time windows 320 of the leaf rule engines 305.

To identify the one or more of the firings 355 within the time window 330, the root conditions engine 310 may parse each event in the group of events in each firing 355 to identify the timestamp corresponding to the time at which the event was invoked. In some embodiments, the root conditions engine 310 may parse the one or more field values of each firing 355 to identify the timestamp from the field values of the firing 355. With the identification of the timestamp of event included in the firing 355, the root conditions engine 310 may compare the timestamp of the event in the firing 355 with the time window 330. In some embodiments, the root conditions engine 310 may maintain a timer or clock to keep track of a current time and to compare the timestamp of the event in the firing 355 against the time window. By comparing the timestamp of the event in the firing 355 against the time window 330, the root conditions engine 310 may determine whether the event in the firing 355 is within the time duration as specified by the time window 330.

In some embodiments, the root conditions engine 310 may determine whether the timestamp of the event in the firing 355 is within the specified time duration relative to the current time. When the timestamp of the event in the firing 355 is within the duration of time specified by the time window 330 relative to the set point in time (e.g., the current time), the root conditions engine 310 may determine that the event in the firing 355 is within the time window 330. Otherwise, when the timestamp of the matched event 350 is not within the duration of time specified by the time window 330 relative to the current time, the root conditions engine 310 may determine that the event in the firing 355 is outside the time window 330. In some embodiments, the root conditions engine 310 may determine whether the timestamp of the event in the firing 355 is between the initial time and the terminal time defined by the time window 330. When the timestamp of the event in the firing 355 is between the initial time and the terminal time defined by the time window 330, the root conditions engine 310 may determine that the firing 355 is within the time window 330. Otherwise, when the timestamp of the event in the firing 355 is not between the initial time and the terminal time defined by the time window 330, the root conditions engine 310 may determine that the firing 355 is outside the time window 330.

If the firing 355 is determined to be within the time window 330, the root conditions engine 310 may pass the event in the firing 355 for additional processing by the root conditions engine 310. In some embodiments, the root conditions engine 310 may also store the firings 355 identified as within the time window 330. Each firing 355 identified as within the time window 330 may be stored on a database maintained by the root conditions engine 310. In some embodiments, the root conditions engine 310 may subsequently access the database to retrieve the firings 355 identified as within the time window 330 for additional processing. On the other hand, if the firing 355 is determined to be outside the time window 330, the root conditions engine 310 may remove the firing 355 from additional processing by the root conditions engine 310.

From the firings 355 identified as within the time window 330, the root conditions engine 310 may identify a collection of events satisfying the conditions 335 specified for the root conditions engine 310. The conditions 335 (sometimes referred herein as the root rules, parent rules, root conditions, or parent conditions) may correspond to or include constraints that the firings 355 identified as within the time window 330 are to satisfy for additional processing by the root conditions engine 310 for the rule engine 300. For example, the constraints for the conditions 335 may include one or more of the field values or other attributes related to the events 350. The conditions 335 may specify or otherwise pertain to a total number of events, a total number of devices, a total number of files, or a total number of bytes, among others, in the firings 355 over the time window 330. The total number of events may specify a minimum or maximum number of the firings 355 within the time window 330 are to occur to satisfy the conditions 335. In some embodiments, the total number of events may specify the minimum or maximum number of distinct events among the firings 355. The total number of devices may specify a minimum or maximum number of devices (e.g., the client devices 210) on which the event in the firing 355 is invoked. In some embodiments, the total number of devices may specify a minimum number of distinct devices. The total number of files may specify a minimum or maximum number of files affected by the group of events in the firings 355 within the time window 330 (e.g., in data transfer, reading or writing). In some embodiments, the total number of files may specify a minimum or maximum number of distinct files. The total number of bytes may specify a minimum or maximum number of bytes affected by the firings 355 within the time window 330 (e.g., in reading or writing). In some embodiments, the total number of bytes may specify a minimum or maximum number of differing bytes or chunks. The conditions 335 may be defined using a script. The script for the conditions 335 may be markup language in the form of:

"correlation method": {
  "fields": ["dg_user"]
}

In the example above, the conditions 335 may include one constraint regarding the user identifier corresponding to the user 235 operating the client device 210.

In identifying the collection of events, the root conditions engine 310 may determine or identify one or more parameters related to the firings 355 identified as within the time window 330. The parameters may include a number of events, a number of devices, a number of files, and a number of files from the firings 355 over the time window 330. In some embodiments, the root conditions engine 310 may identify a number of the firings 355 identified as within the time window 330. In some embodiments, the root conditions engine 310 may maintain a counter to iteratively tally the number of firings 355 passing through the time window 330. In some embodiments, the root conditions engine 310 may also parse each event in the firing 355 identified as within the time window 330 to identify the one or more field values of the event in the firing 355. The identified field values from the event in the firing 355 may include the application identifier, the number of bytes, and/or the file identifiers, among others. In some embodiments, the root conditions engine 310 may identify the number of bytes from the files corresponding to the file identifiers in the event in the firing 355. The root conditions engine 310 may find the files corresponding to the file identifiers. With the identification of the files, the root conditions engine 310 may identify a length or size of the files corresponding to the file identifiers. Based on the length or size of the files, the root conditions engine 310 may determine the number of bytes.

With the identification of various parameters, the root conditions engine 310 may compare the parameters related to the firings 355 identified as within the time window 330 against the constraints specified by the conditions 335. In some embodiments, the root conditions engine 310 may apply the conditions 335 onto the firings 355 identified as within the time window 330 to identify the collection of events. In comparing, the root conditions engine 310 may determine whether each parameter related to the firings 355 satisfies a corresponding constraint of the conditions 335. In some embodiments, the root conditions engine 310 may shift or adjust the time window 330 in applying the conditions 335. The time window 330 may be adjustable forward or backward in time. By adjusting the time window 230, the root conditions engine 310 may identify a different set of firings 355. The root conditions engine 310 may apply the constraints of the conditions 335 to the different set of firings 355 identified from adjusting the time window 330 to identify a collection of events satisfying the conditions 335.

In some embodiments, the root conditions engine 310 may compare the number of events identified from the firings 355 with the total number of events specified by the conditions 335. If the number of events is less than or equal to the maximum number of events and/or is greater than or equal to the minimum number of events (e.g., within a defined range), the root conditions engine 310 may determine that the number of events satisfy the total number of events. Otherwise, if the number of events is greater than the maximum number of events and/or is less than the minimum number of events, the root conditions engine 310 may determine that the number of events does not satisfy the total number of events. In some embodiments, the root conditions engine 310 may compare the number of devices identified from the firings 355 with the total number of devices specified by the conditions 335. If the number of devices is less than or equal to the maximum number of devices and/or is greater than or equal to the minimum number of devices, the root conditions engine 310 may determine that the number of devices satisfy the total number of events. Otherwise, if the number of devices is greater than the maximum number of devices or is less than the minimum number of devices, the root conditions engine 310 may determine that the number of devices does not satisfy the total number of devices.

In some embodiments, the root conditions engine 310 may compare the number of files identified from the firings 355 with the total number of files specified by the conditions 335. If the number of files is less than or equal to the maximum number of files and/or is greater than or equal to the minimum number of files, the root conditions engine 310 may determine that the number of files satisfy the total number of files. Otherwise, if the number of files is greater than the maximum number of files or is less than the minimum number of files, the root conditions engine 310 may determine that the number of files does not satisfy the total number of files. In some embodiments, the root conditions engine 310 may compare the number of bytes identified from the firings 355 with the total number of bytes specified by the conditions 335. If the number of bytes is less than or equal to the maximum number of bytes and/or is greater than or equal to the minimum number of bytes, the root conditions engine 310 may determine that the number of bytes satisfy the total number of events. Otherwise, if the number of bytes is greater than the maximum number of bytes or is less than the minimum number of bytes, the root conditions engine 310 may determine that the number of bytes does not satisfy the total number of bytes.

When the parameters related to the firings 355 within the time window 330 satisfy the all constraints of the conditions 335, the root conditions engine 310 may identify the firings 355 as the collection of events. In some embodiments, the root conditions engine 310 may select or identify the firings 355 as at least one firing 360 to provide for additional processing by the action trigger 255. In some embodiments, the firing 360 may include the collection of events identified from the firings 355 satisfying the conditions 335. In some embodiments, the firing 360 may indicate that at least a subset of the events 345 received via the event stream 345 may satisfy the conditions 335 within the time window 330 for the root conditions engine 310. The firing 360 itself may indicate that the at least the subset of events 345 potentially corresponds to an anomaly, a risk, or a threat. The root conditions engine 310 may provide the collection of events as the firing 360 to the action trigger 255 for additional processing. On the other hand, when the parameters related to the firings 355 within the time window 330 do not satisfy at least one of the constraints of the conditions 335, the root conditions engine 310 may identify none of the firings 355 as satisfying the conditions 335. In addition, the root conditions engine 310 may continue to apply the conditions 335 to the firings 355 identified as within the time window 330.

In accordance with the collection of events in the firing 360, the action trigger 225 executing on the event correlation system 205 may execute an action 365. In some embodiments, the action 365 may include an alarm for a potential anomaly, risk, or threat. The alarm may be presented by the action trigger 225 on the event correlation system 205 itself (e.g., on a display to a network administrator). The alarm may be also presented by the action trigger 225 on the client device 210 (e.g., on a display to the user 235). The action trigger 225 may send a command to the client device 210 to present the alarm (e.g., as a prompt on the display or an audio output over the speakers). In some embodiments, the action 365 may include halting the execution of the program 230 associated with the collection of events in the firing 360 on the client device 210. The action trigger 225 may send a command to the client device 210 to pause or terminate the execution of the program 230 associated with the collection of events identified by the root conditions engine 310 in the firing 360.

In some embodiments, the leaf rule engine 305 (or the correlation rule engine 220) may modify or update the filter 315, the time window 320, and/or the conditions 325. In some embodiments, the leaf rule engine 305 may receive specifications from a network administrator operating the event correlation system 205. The specifications may include values for the filter 315, the time window 320, or the conditions 325. Responsive to receipt, the leaf rule engine 305 may update the values of the filter 315, the time window 320, or the conditions 320 in accordance to the specifications. In some embodiments, the leaf rule engine 305 may receive specifications from a model updated using a training dataset. The training dataset may include a set of sample events with one or more field values. Each sample event in the training dataset may be labeled as normal or abnormal behavior. The model may include an artificial neural network, a Naïve Bayesian model, a regression model, a support vector machine, and a decision tree, among others. The correlation rule engine 220 may train and update the model using the training dataset. Based on the model, the correlation rule engine 220 may generate or output the specifications for each leaf rule engine 305. Responsive to receipt, the leaf rule engine 305 may update the values of the filter 315, the time window 320, or the conditions 320 in accordance to the specifications.

In some embodiments, the root conditions engine 310 (or the correlation rule engine 220) may modify or update the time window 330 or the conditions 335. In some embodiments, the root conditions engine 310 may receive specifications from a network administrator operating the event correlation system 205. The specifications may include values for the time window 330 or the conditions 335. Responsive to receipt, the root conditions engine 310 may update the values of time window 330 or the conditions 335 in accordance to the specifications. In some embodiments, the root conditions engine 310 may receive specifications from a model updated using a training dataset. The training dataset may include a set of sample events with one or more field values. Each sample event in the training dataset may be labeled as normal or abnormal behavior. The model may include an artificial neural network, a Naïve Bayesian model, a regression model, a support vector machine, and a decision tree, among others. The correlation rule engine 220 may train and update the model using the training dataset. Based on the model, the correlation rule engine 220 may generate or output the specifications for each root conditions engine 310. Responsive to receipt, the root conditions engine 310 may update the values of the time window 330 or the conditions 335 in accordance to the specifications.

Figure 4:
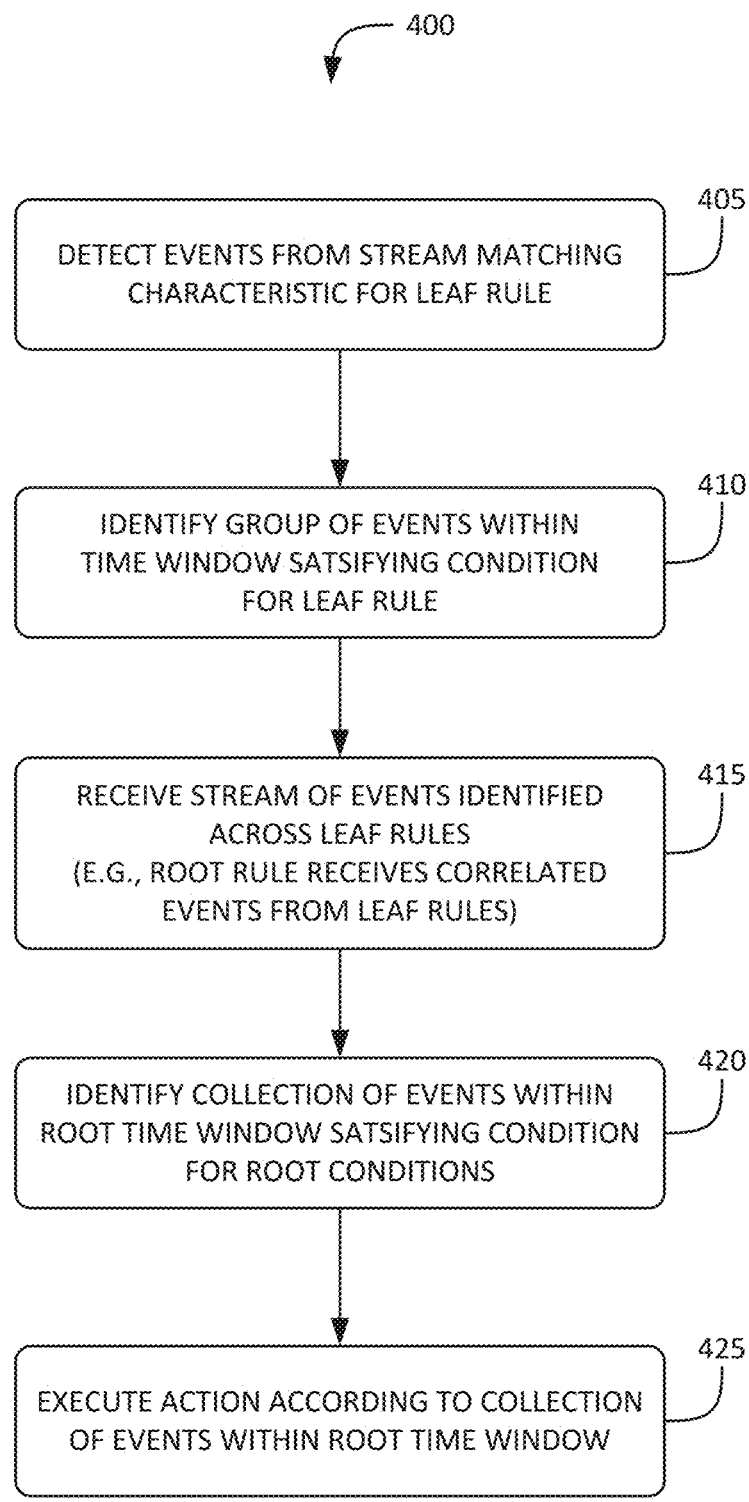
FIG. 4 is a flow diagram depicting an example embodiment of a method of multi-event correlation.

Referring now to FIG. 4, an embodiment of a method 400 for multi-event correlation is depicted. The method 400 may be performed or be executed by any one or more components of the system 100 described above in conjunction with FIGS. 1A-1D or the system 200 described above in conjunction with FIGS. 2 and 3. In brief overview, each leaf rule engine may detect events from a stream matching characteristics for the leaf rule engine (405). The leaf rule engine may identify a group of events within a time window satisfying a condition for the leaf rule engine (410). A root conditions engine may receive a stream of events identified across the leaf rule engines (415). The root conditions engine may identify a collection of events within a root time window satisfying a condition for root conditions engine (420). A trigger may execute an action according to the collection of events within the root time window (425).

In further detail, each leaf rule engine (e.g., the leaf engine 305) may detect, monitor and/or identify events (e.g., the events 345) from a stream (e.g., the event stream 340) matching characteristics for the leaf rule engine (405). The stream of events may be established with one or more client devices (e.g., the client device 210) on a network (e.g., the network 215) to receive the events 345. Each event 345 can correspond to any activity of a user (e.g., the user 235) or a function call by the client device or a program (e.g., the program 230) running on the client device.

The leaf rule engine may detect, monitor and/or identify a group of events (e.g., matched events 350) within a time window (e.g., the time window 320) satisfying a condition (e.g., the conditions 325) for the leaf rule engine (410). The leaf rule engine may use a filter (e.g., the filter 315) to identify the group of events. The filter may define which events are to be processed by the leaf rule engine. The time window may specify a duration of time within which the events are occur for addition processing by the leaf rule engine. The condition may specify constraints (e.g., characteristics or attributes) that the group events within the time window are to satisfy for additional processing.

A root conditions engine (e.g., the root conditions engine 310) may intercept, access and/or receive a stream of events (e.g., the firings 355) identified across the leaf rule engines (415). For example, the root rule may receive correlated events from leaf rules. The stream of events may correspond to events that satisfy the conditions and the time window as specified within each leaf rule engine. The leaf rule engine may provide the identified stream of events to the root conditions engine.

The root conditions engine may identify and/or detect a collection of events (e.g., firings 360) within a root time window (e.g., the time window 330) satisfying a condition (e.g., the conditions 335) for root conditions engine (420). The time window may specify a duration of time within which the events are occur for addition processing by the root conditions engine. The condition\ may specify constraints (e.g., characteristics or attributes) that the group events within the time window are to satisfy for additional processing.

A trigger (e.g., the action trigger 225) may trigger, initiate and/or execute an action (e.g., the action 365) according to the collection of events within the root time window (425). The root conditions engine may provide the collection of events to the action trigger 225. Upon receipt, the trigger may initiate an action based on the collection of events. The action may include an alarm for a potential anomaly, risk, or threat presented to a network administrator. The action may also include a command to pause or terminate execution of the program associated with the collection of events.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Non-limiting examples of various embodiments are disclosed herein. Features from one embodiments disclosed herein may be combined with features of another embodiment disclosed herein as someone of ordinary skill in the art would understand.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of"

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A system for multi-event correlation, comprising:
one or more processors coupled with memory, configured to:
receive, for a leaf rule, a stream of events each corresponding to an activity of at least one of a user, a device, or a program;
detect, from the stream of events, a first plurality of events in accordance with a filter of the leaf rule;
identify, from the first plurality of events, a second plurality of events satisfying a condition within a time window of the leaf rule; and
provide the second plurality of events to a root rule to identify a third plurality of events with which to execute an action in accordance with a trigger.

2. The system of claim 1, wherein the one or more processors is further configured to modify at least one of the filter, the condition, or the time window of the leaf rule based at least on an administrative specification.

3. The system of claim 1, wherein the one or more processors is further configured to set at least one of the filter, the condition, or the time window of the leaf rule using a machine learning model.

4. The system of claim 1, wherein the one or more processors is further configured to shift the time window to apply the conditions to the first plurality of events.

5. The system of claim 1, wherein the filter of the leaf rule defines a characteristic of events identified to be at least one of a potential anomaly, a risk, or a threat to detect the first plurality of events.

6. The system of claim 1, wherein the condition of the leaf rule defines at least one of a total number of events, a total number of devices, a total number of files, or a total number of bytes accumulated within the time window to identify the second plurality of events.

7. The system of claim 1, wherein at least one of the filter, the condition, or the time window of the leaf rule differs from a corresponding filter, condition, or time window of another leaf rule.

8. A system for multi-event correlation, comprising:
one or more processors coupled with memory, configured to:
receive, for a root rule, a stream of events identified by a leaf rule, each event of the stream of events corresponding to an activity at least one of a user, a device, or a program;
determine, from the stream of events, a first plurality of events within a time window of the root rule;

identify, from the first plurality of events within the time window, a second plurality of events satisfying a condition of the root rule; and provide, to a trigger, the second plurality of events with which to execute an action.

9. The system of claim 8, wherein the one or more processors is further configured to modify at least one of the filter, the condition, or the time window of the root rule based at least on an administrative specification.

10. The system of claim 8, wherein the one or more processors is further configured to set at least one of the filter, the condition, or the time window of the root rule using a machine learning model.

11. The system of claim 8, wherein the one or more processors is further configured to aggregate the stream of events identified from a plurality of leaf rules, each of the plurality of leaf rules identifying a corresponding subset of events in accordance with a respective filter, time window, and condition.

12. The system of claim 8, wherein the time window of the root rule differs from a time window of the leaf rule to determine the first plurality of events from the stream of events.

13. The system of claim 8, wherein the condition of the root rule defines at least one of a total number of events, a total number of devices, a total number of files, or a total number of bytes accumulated within the time window to identify the second plurality of events.

14. The system of claim 8, wherein the action executed by the trigger includes at least one of: an initiation of an alarm for a potential anomaly, a risk, or threat; or a provision of an instruction to pause or terminate execution of the program.

15. A method of correlating across multiple events, comprising:

receiving, by a computing system, for a leaf rule, a stream of events each corresponding to an activity of at least one of a user, a device, or a program;

detecting, by the computing system, from the stream of events, a first plurality of events in accordance with a filter of the leaf rule;

identifying, by the computing system, from the first plurality of events, a second plurality of events satisfying a condition within a time window of the leaf rule; and providing, by the computing system, the second plurality of events to a root rule to identify a third plurality of events.

16. The method of claim 15, further comprising:

determining, by the computing system, from the second plurality of events, the third plurality of events within a time window of the root rule;

identifying, by the computing system, from the third plurality of events within the time window of the root rule, a fourth plurality of events satisfying a condition of the root rule; and provide, to a trigger, the fourth plurality of events with which to execute an action.

17. The method of claim 16, further comprising aggregating, by the computing system, the second plurality of events identified from a plurality of leaf rules, each of the plurality of leaf rules identifying a corresponding subset of events in accordance with a respective filter, time window, and condition.

18. The method of claim 16, wherein the action executed by the trigger includes at least one of: an initiation of an alarm for a potential anomaly, a risk, or threat; or a provision of an instruction to pause or terminate execution of the program.

19. The method of claim 15, wherein the filter of the leaf rule defines a characteristic of events identified to be at least one of a potential anomaly, a risk, or a threat to detect the first plurality of events.

20. The method of claim 15, wherein the condition of the leaf rule defines at least one of a total number of events, a total number of devices, a total number of files, or a total number of bytes accumulated within the time window to identify the second plurality of events.

* * * * *